June 16, 1925.
C. SHIPMAN
1,542,009
WEED CUTTING ATTACHMENT FOR PLOWS
Filed Dec. 30, 1924
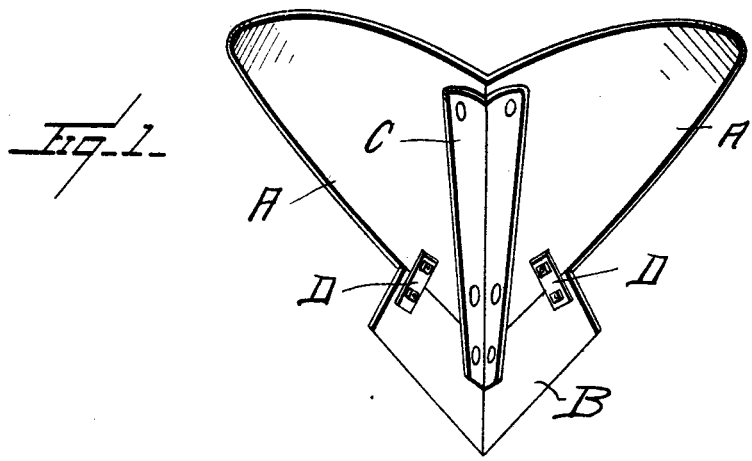
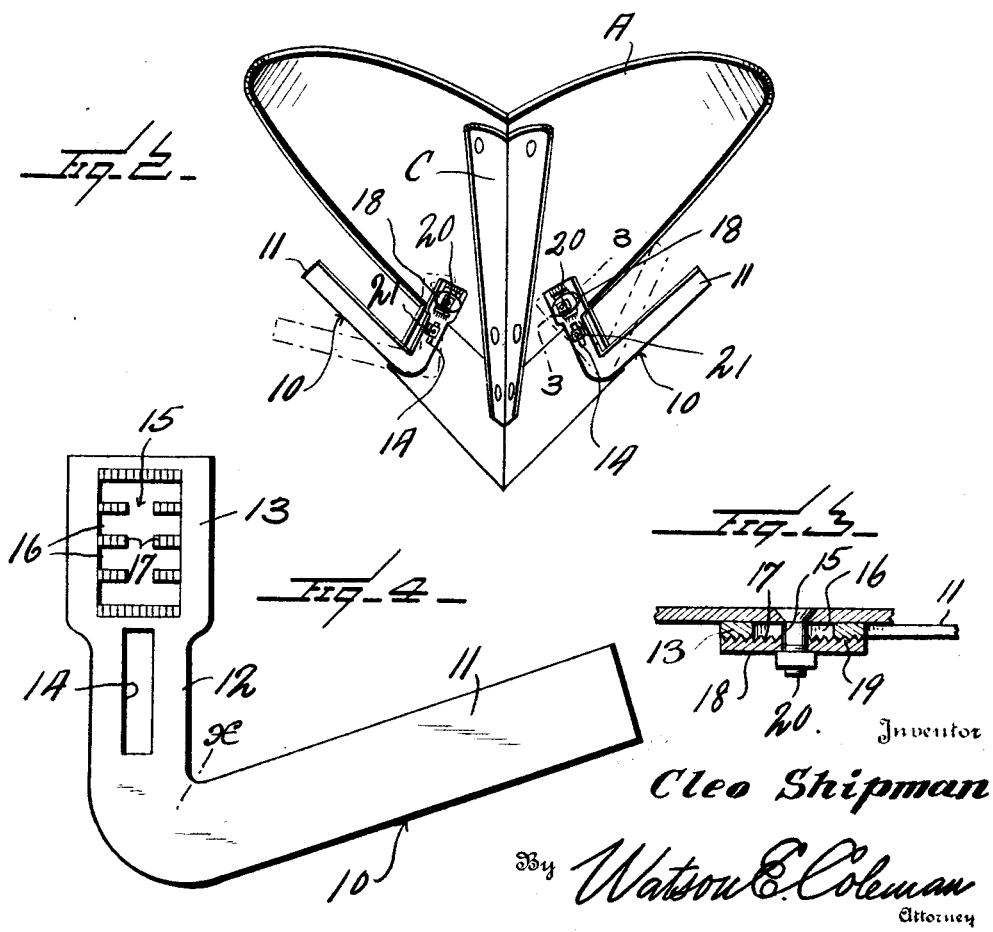
Inventor
Cleo Shipman
By Watson E. Coleman
Attorney Patented June 16, 1925.

1,542,009

UNITED STATES PATENT OFFICE.

CLEO SHIPMAN, OF HAMLIN, TEXAS.

WEED-CUTTING ATTACHMENT FOR PLOWS.

Application filed December 30, 1924. Serial No. 758,867.

*To all whom it may concern:*

Be it known that I, CLEO SHIPMAN, a citizen of the United States, residing at Hamlin, in the county of Jones and State of Texas, have invented certain new and useful Improvements in Weed-Cutting Attachments for Plows, of which the following is a specification, reference being had to the accompanying drawings.

This invention relates to weed cutting attachments for plows and particularly to weed cutting attachments in the form of knives adapted to be mounted upon a buster plow.

When planting or listing land with a buster plow a hard ridge is left on each side of the bed and weeds may be on the side of the bed.

The general object of the present invention is to provide weed cutting attachments adapted to be mounted upon a buster plow at the junction of the point of the plow with the wings thereof whereby the knives of the attachment will cut or kill weeds which the buster plow will not affect in any way.

A further object is to provide knives so constructed that they may be applied to any ordinary buster plow and particularly to provide knives which are adjustable into a plurality of angles and a further object is to provide knives the shanks of which are so constructed that they may be applied to the buster plow in place of the ordinary straps which connect the wings to the plow point.

Other objects will appear in the course of the following description.

My invention is illustrated in the accompanying drawings, wherein:—

Figure 1 is a rear elevation of a buster plow as ordinarily used;

Figure 2 is a like view to Fig. 1 but showing the manner in which my attachments are applied to connect the point and wings;

Figure 3 is a section on the line 3—3 of Figure 2; and

Figure 4 is a face view of one of the knives detached.

A buster plow ordinarily comprises the wings A and a point B. This point is connected to the wings by means of a longitudinally extending member C which is riveted, bolted or otherwise connected to the wings and extends down on the inside faces of the wings at their junction and projects beyond the lower edges of the wings. This member C is connected to the plow point B in any suitable manner, and also connecting the plow point B with these wings is a pair of straps, designated D in Figure 1. So far I have described an ordinary buster plow. My attachment comprises two knives both of the same form and character which are designated generally 10 in Figure 4. Each of these knives has a blade 11 and a shank 12 which is angularly related to the blade. This shank 12 is disposed at an acute angle to the blade 11 and at its inner end this shank 12 is widened as at 13. Between this widened portion 13 and the base of the blade 11, the shank is formed with a longitudinally extending slot 14 adapted for the passage of a bolt. The widened portion 13 is formed with a longitudinally extending slot 15 intersected by transversely extending slots 16. The material between these slots is longitudinally grooved, ridged or notched, as at 17 and coacting with this ridged or notched face is a washer 18 whose face is longitudinally notched, as at 19, the washer being formed with a central opening for the passage of a bolt. The blade 11 will be made about three-sixteenths of an inch thick and one and one-half inches wide and preferably will be made in three lengths, namely, six inches, eight inches and ten inches from the point $x$ to the extremity of the blade. The widened portion 13 will preferably be about two and one-quarter inches wide and the slot 14 will preferably be about two inches long and wide enough for a three-eighths inch bolt while the slot 15 will be preferably two inches long and one and one-quarter inches wide so as to provide for the use of a three-eighths inch bolt.

In the use of this device, the straps D are removed from the buster plow and the knives disposed upon the inside faces of the point and wings, as illustrated in Figure 2 and held in place by bolts 20 which pass through the slot 15 and the extension 16 thereof and by bolts 21 which pass through the slots 14. The same bolts may be used as are used for holding the straps D in place. As illustrated in dotted lines these knives 10 can be shifted up or down or be disposed in various angular relations to the line of draft to make either a shallow cut or a deep cut as desired.

The knives, it will be seen, are disposed in approximate alignment with the side edges of the buster point B so that the knives will not catch any trash and these knives will cut and kill weeds which the buster will not touch.

Having described my invention, what I claim is:—

1. In combination with a buster plow having wings and a point the wings adjacent the point being perforated for the passage of bolts and the point adjacent the wings being also perforated for the passage of bolts, of a weed cutting attachment therefor comprising two knives each having a blade and a shank angularly disposed relative to the blade, the shanks extending across the face of the point and on to the wings and being slotted for the passage of bolts passed through the apertures of the wings and point, the slots permitting an angular adjustment of the knives.

2. The combination with a buster plow having wings and a point, the wings adjacent the point being perforated for the passage of bolts and the point adjacent the wings being perforated for the passage of bolts, of a weed cutting attachment therefor comprising two knives, each knife having a blade and a shank angularly disposed with relation to the blade, the blade of each knife being disposed adjacent the lower edge of the point, the shank extending upward across the point and overlapping the corresponding wing, said shank having a slot for the passage of the bolt through the point and the upper end of the shank being formed with a longitudinally extending slot having lateral extensions and adapted for the passage of the bolt passing through the wing, the lower edge of the knife being approximately coincident with the lower edge of the point and extending rearward therefrom.

In testimony whereof I hereunto affix my signature.

CLEO SHIPMAN.